United States Patent
Asanuma

(10) Patent No.: US 10,571,563 B2
(45) Date of Patent: Feb. 25, 2020

(54) RADAR DEVICE AND SIGNAL PROCESSING METHOD

(71) Applicant: FUJITSU TEN LIMITED, Kobe-shi, Hyogo (JP)

(72) Inventor: Hisateru Asanuma, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 380 days.

(21) Appl. No.: 15/492,371

(22) Filed: Apr. 20, 2017

(65) Prior Publication Data

US 2017/0350975 A1    Dec. 7, 2017

(30) Foreign Application Priority Data

Jun. 3, 2016 (JP) ................ 2016-111929

(51) Int. Cl.
| | |
|---|---|
| *G01S 13/60* | (2006.01) |
| *G01S 13/931* | (2020.01) |
| *G01S 7/35* | (2006.01) |
| *G01S 13/42* | (2006.01) |
| G01S 13/93 | (2020.01) |
| G01S 13/34 | (2006.01) |

(52) U.S. Cl.
CPC ............ *G01S 13/931* (2013.01); *G01S 7/354* (2013.01); *G01S 13/42* (2013.01); *G01S 13/60* (2013.01); *G01S 13/34* (2013.01); *G01S 2013/9353* (2013.01); *G01S 2013/9375* (2013.01)

(58) Field of Classification Search
CPC ........ G01S 13/931; G01S 13/93; G01S 13/42; G01S 13/34; G01S 13/60; G01S 7/35; G01S 7/352; G01S 7/354; G01S 2013/9353; G01S 2013/9375
See application file for complete search history.

(56) References Cited

U.S. PATENT DOCUMENTS

| | | | | |
|---|---|---|---|---|
| 5,793,325 | A  * | 8/1998 | Yamada | ................ G01S 13/931 342/158 |
| 6,768,446 | B2 * | 7/2004 | Tamatsu | ................ G01S 7/414 342/107 |
| 2003/0034913 | A1 * | 2/2003 | Asanuma | .............. G01S 7/4026 342/70 |
| 2007/0143004 | A1 * | 6/2007 | Sakuma | ................ G01S 7/412 701/532 |

(Continued)

FOREIGN PATENT DOCUMENTS

| | | |
|---|---|---|
| JP | H07-333340 A | 12/1995 |
| JP | 2000-249759 A | 9/2000 |

(Continued)

*Primary Examiner* — Timothy A Brainard
(74) *Attorney, Agent, or Firm* — Oliff PLC

(57) ABSTRACT

There is provided a radar device. A detecting unit is configured to detect a lateral location of a target relative to a vehicle equipped with the radar device, on the basis of reflected waves from the target. A selecting unit is configured to select a predetermined number of detection values from a detection value history including detection values of the lateral location detected by the detecting unit in chronological order. The predetermined number depends on a turning radius of the vehicle. A determining unit is configured to determine a definite value of the lateral location on the basis of the detection values selected by the selecting unit.

4 Claims, 7 Drawing Sheets

(56) References Cited

U.S. PATENT DOCUMENTS

| | | | | |
|---|---|---|---|---|
| 2008/0074246 A1* | 3/2008 | Isaji | ............... | B60T 7/22 |
| | | | | 340/435 |
| 2012/0035846 A1* | 2/2012 | Sakamoto | ......... | B60T 8/17558 |
| | | | | 701/301 |
| 2012/0046802 A1* | 2/2012 | Inou | ............. | B60W 30/10 |
| | | | | 701/1 |
| 2013/0080019 A1* | 3/2013 | Isaji | ............. | B60W 30/16 |
| | | | | 701/96 |

FOREIGN PATENT DOCUMENTS

| JP | 2001-141812 A | 5/2001 |
|---|---|---|
| JP | 2006-162341 A | 6/2006 |
| JP | 2015-225008 A | 12/2015 |

\* cited by examiner

FIG. 7
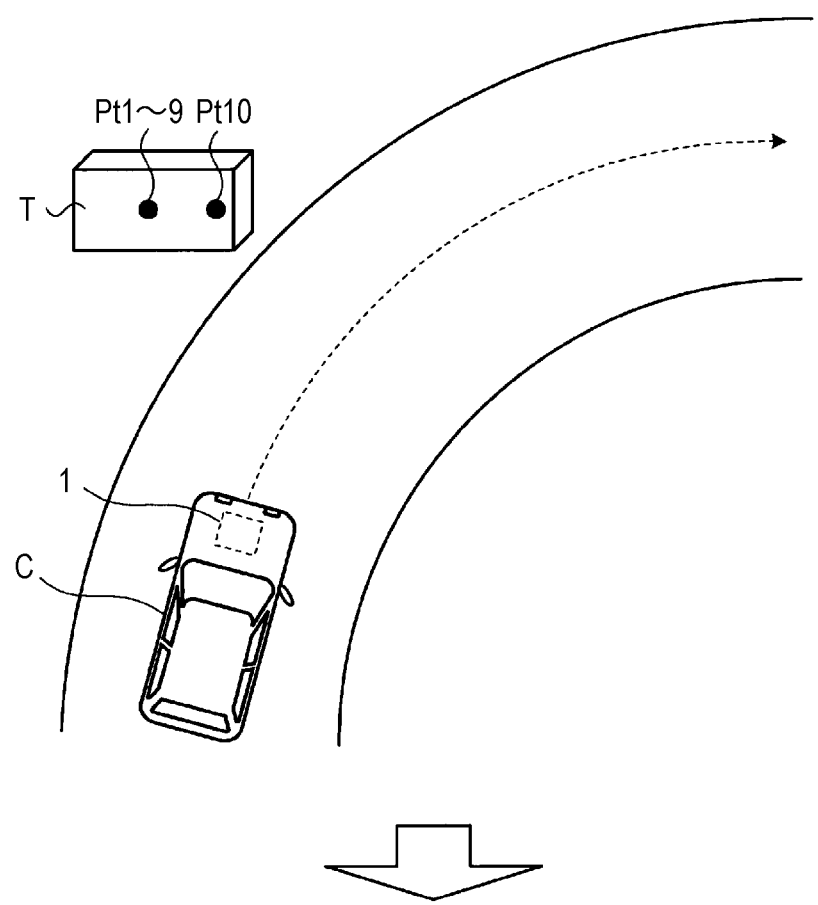
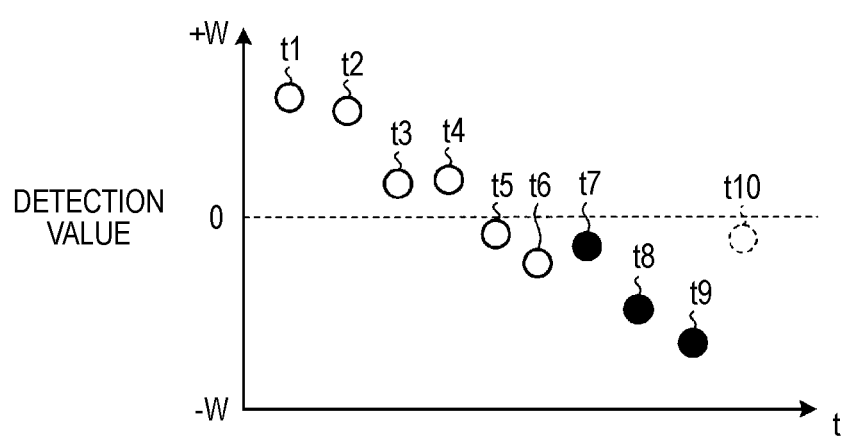

FIG. 8
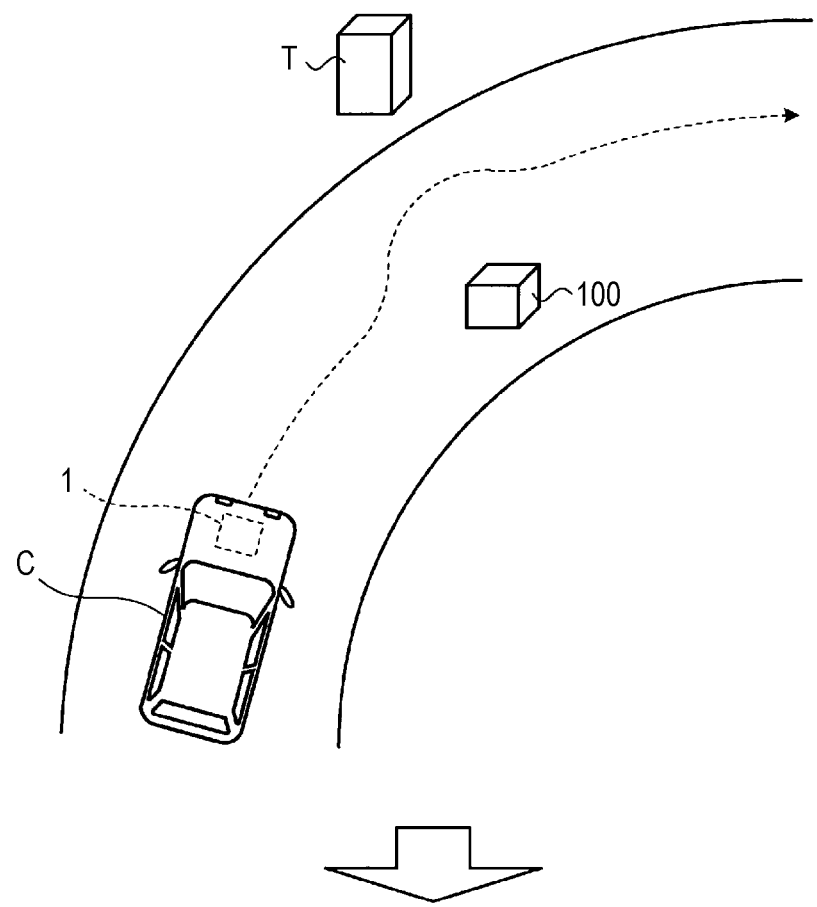
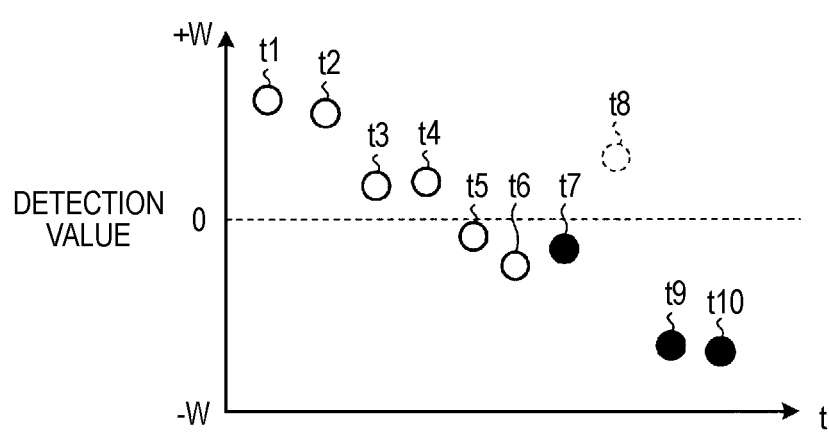

RADAR DEVICE AND SIGNAL PROCESSING METHOD

CROSS-REFERENCE TO RELATED APPLICATIONS

This application is based on and claims priority from Japanese Patent Application No. 2016-111929 filed on Jun. 3, 2016.

TECHNICAL FIELD

The present invention relates to a radar device and a signal processing method.

RELATED ART

There is, for example, a radar device for detecting a location of a target and so on by transmitting a transmission wave in a traveling direction of a vehicle equipped with the radar device and receiving reflected waves from the target.

The radar device stores detection values of the relative location of the target in the vehicle width direction of the vehicle (hereinafter, referred to as a lateral location) as a detection value history, and determines the lateral location of the target on the basis of the detection value history (see Patent Document 1 for instance).

Patent Document 1: Japanese Patent Application Publication No. 2015-225008A

However, it cannot be said that the related-art device determines the lateral location of the target with high accuracy. Specifically, for example, in a case where the vehicle runs around a curve, since changes in the lateral location of the target increase, an error between the determined lateral location and the actual lateral location may be larger than an error when the vehicle runs straight.

SUMMARY

It is therefore an object of the present invention to provide a radar device and a signal processing method capable of improving the accuracy of detection on the lateral location of the target.

In order to solve the above-described problem and achieve the object, a radar device according to the present invention includes a detecting unit, a selecting unit, and a determining unit. The detecting unit is configured to detect a lateral location of a target relative to a vehicle equipped with the radar device, on the basis of reflected waves from the target. The selecting unit is configured to select a predetermined number of detection values, the predetermined number depending on a turning radius of the vehicle, from a detection value history including detection values of the lateral location detected by the detecting unit in chronological order. The determining unit is configured to determine a definite value of the lateral location on the basis of the detection values selected by the selecting unit.

According to the present invention, it is possible to improve the accuracy of detection on the lateral location of the target.

BRIEF DESCRIPTION OF THE DRAWINGS

Exemplary embodiments of the present invention will be described in detailed based on the following figures, wherein:

FIG. 7 is a view illustrating a first part of a processing content of a selecting unit according to a modified example of the embodiment of the present invention; and FIG. 8 is a view illustrating a second part of the processing content of the selecting unit according to the modified example of the embodiment.

DETAILED DESCRIPTION

Hereinafter, embodiments of a radar device and a signal processing method to be disclosed in this specification will be described in detail with reference to the accompanying drawings. However, the present invention is not limited to the following embodiments.

Figure 1:
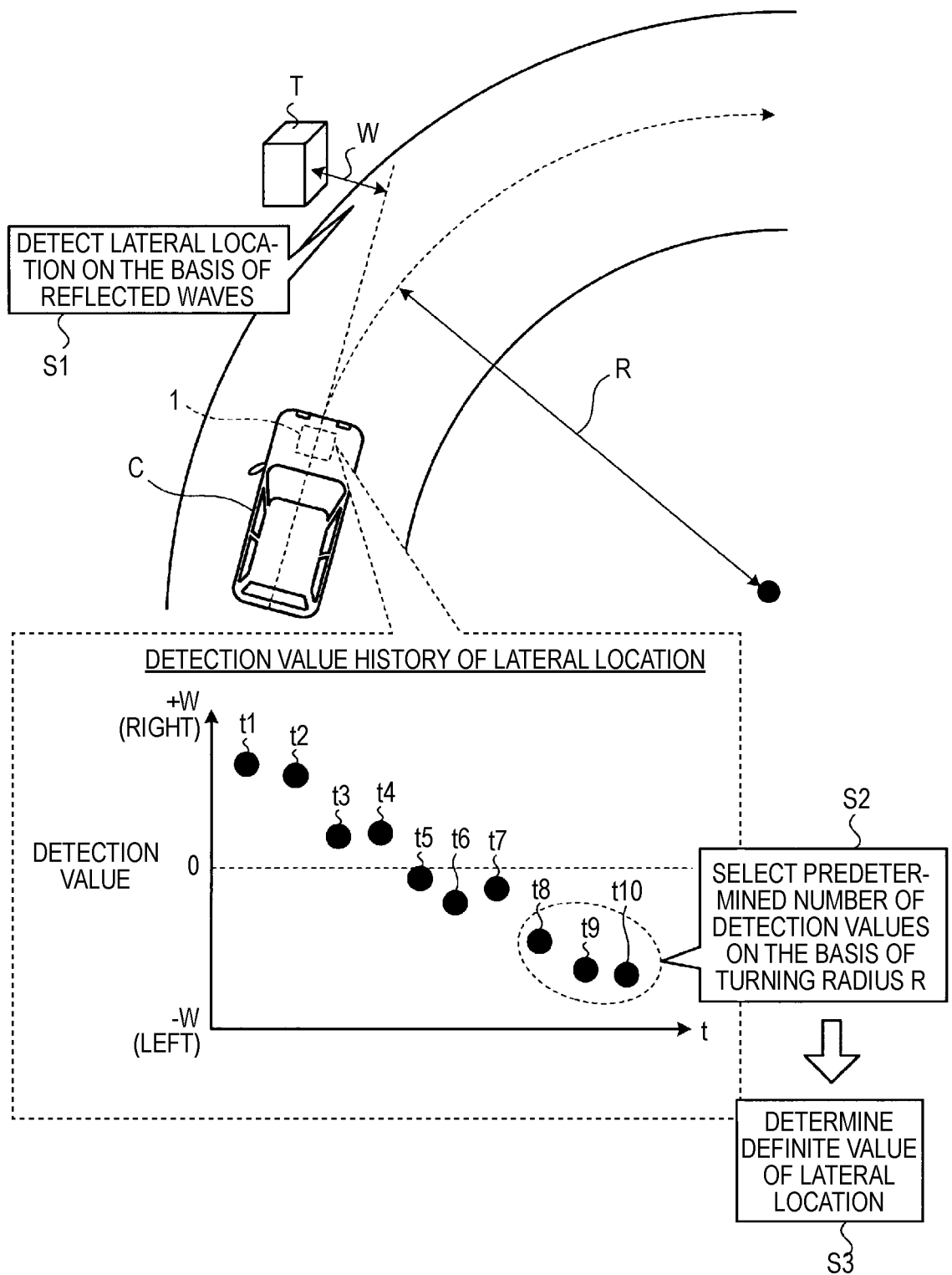
FIG. 1 is a view illustrating an overview of a signal processing method according to an embodiment of the present invention.

First, a signal processing method according to an embodiment will be described with reference to FIG. 1. FIG. 1 is a view illustrating an overview of the signal processing method according to the embodiment. Also, FIG. 1 shows a case in which a radar device 1 for performing the signal processing method is mounted on a vehicle C (hereinafter, referred to as a own vehicle C) and the vehicle C runs around a curve with a turning radius R.

Also, the radar device 1 uses a so-called FMCW (frequency-modulated continuous-wave) system, and detects lateral location W of a target T on the basis of reflected waves. Further, the radar device stores the detection values of the lateral location W as a detection value history in chronological order (from a time point t1 to a time point t10). Also, it is assumed that the detection values are sequentially deleted in chronological order and new detection values are added.

The target T is a still target installed, for example, on a side strip, a sidewalk, a road, or the like, and is, for example, a traffic light, a pole, a guide rail, or the like; however, the target T is not limited thereto. For example, the targets T may be a moving object, such as a preceding vehicle or a bicycle running in front of the own vehicle C, or a pedestrian.

Also, in the detection values of the detection value history of the lateral location W shown in FIG. 1, the center position of the own vehicle C is represented by 0, and distances in the right direction from the own vehicle C are represented by positive values, and distances in the left direction from the own vehicle C are represented by negative values. Hereinafter, the detection values of the lateral location W and a definite value of the lateral location W will also be referred to simply as detection values and a definite value.

In the signal processing method according to the embodiment, a predetermined number of detection values are selected from the detection value history including the detection values of the lateral location W in chronological order, where the predetermined number depends on a turning radius R of the own vehicle C and a definite value of the lateral location W of the target T is determined on the basis of the selected detection values.

Now, a definite-value determining method of the related art will be described. In the determining method of the related art, the average value of all detection values included in the detection value history, for example, ten detection values (corresponding to time points t1 to t10) is determined as a definite value at the time point t10, whereby variation in the definite value is suppressed.

However, for example, in a case where the own vehicle C runs around a curve as shown in FIG. 1, since the target T is considered as flowing in the lateral direction of the own vehicle C varies, for example, a detection value change from the time point t1 to time point t10 is larger than a change when the vehicle runs straight.

In this case, if the average value from the time point t1 to the time point t10 is determined as a definite value according to the determining method of the related art described above, the average value is significantly deviated from the actual lateral location W corresponding to the time point t10, and in the case shown in FIG. 1, the average value is close to the center position (zero) of the own vehicle C.

In other words, according to the determining method of the related art, in a case where a detection value change is large like when the vehicle runs around a curve, an error between the actual lateral location W and a definite value is large. For this reason, it cannot be said that the determining method of the related art determines a detection value of the lateral location W as a definite value with high accuracy.

Therefore, in the signal processing method according to the embodiment, the number of detection values to be used to determine a definite value, for example, when the own vehicle C runs around a curve is changed. Specifically, first, in STEP S1, the radar device 1 sequentially detects detection values of the lateral location W based on reflected waves. Subsequently, in STEP S2, the radar device 1 selects a predetermined number of detection values from the detection value history including the detection values of the lateral location W in chronological order, where the predetermined number depends on the turning radius R of the own vehicle C. Next, in STEP S3, the radar device 1 determines a definite value of the lateral location W on the basis of the selected detection values.

For example, as shown in FIG. 1, the radar device 1 selects three detection values according to the turning radius R of the own vehicle C, for example, from ten detection values. Subsequently, the radar device 1 determines the average value of the selected three detection values as a definite value corresponding to the time point t10. In this case, the number of detection values to be selected is changed depending on the turning radius R.

As the number of detection values to be selected is changed depending on the turning radius R as described above, with respect to any turning radius R, it is possible to reduce an error between a determined definite value and an actual lateral location W, and thus it is possible to improve the accuracy of detection of a definite value of a lateral location W.

Figure 2:
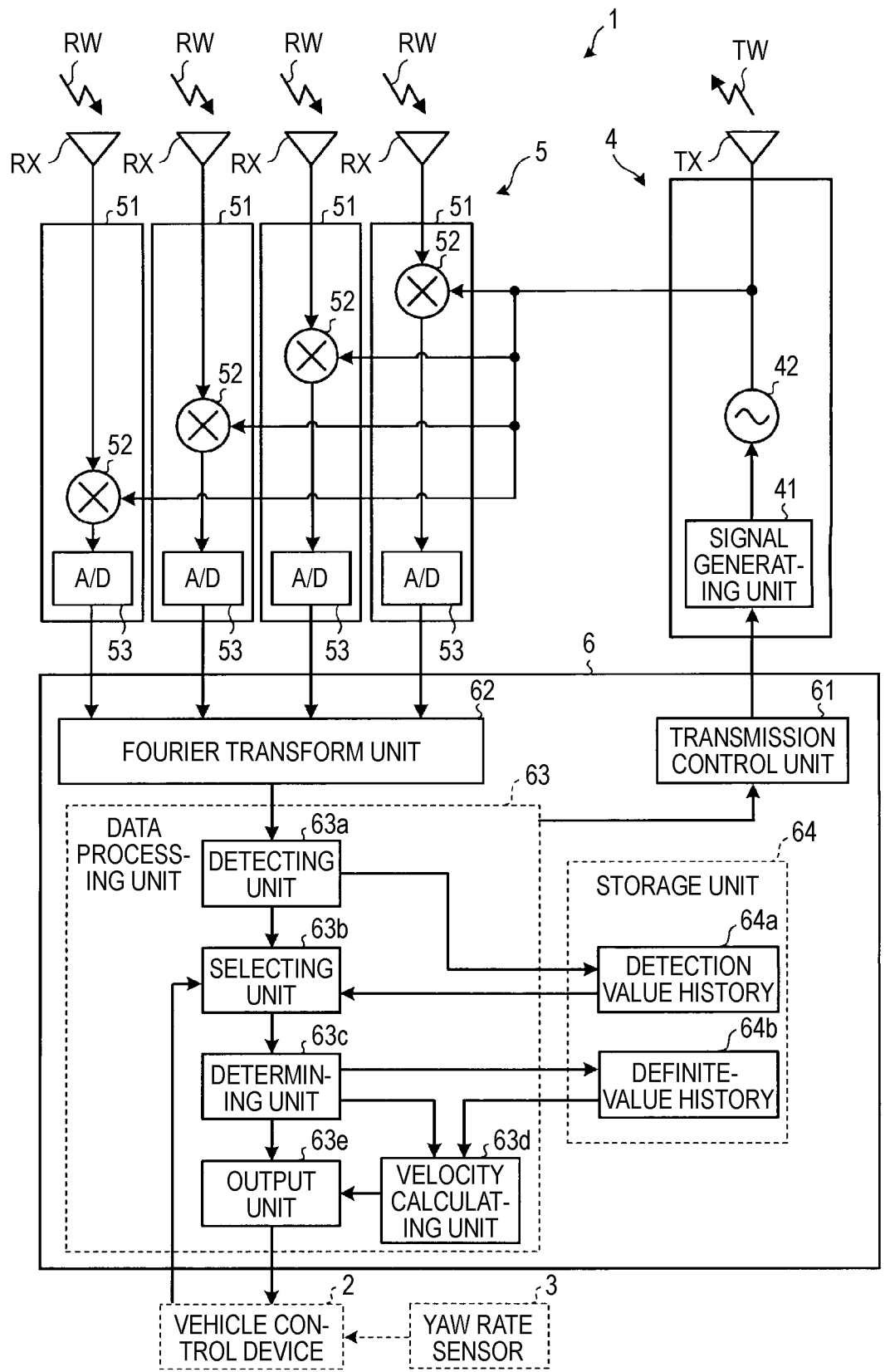
FIG. 2 is a block diagram illustrating a configuration of a radar device according to the embodiment of the present invention.

Now, the configuration of the radar device 1 according to the embodiment will be described in detail with reference to FIG. 2. FIG. 2 is a block diagram illustrating the configuration of the radar device 1 according to the embodiment. As shown in FIG. 2, the radar device 1 is connected to, for example, a vehicle control device 2. Also, the radar device 1 includes a signal transmitting unit 4, a signal receiving unit 5, and a signal processing unit 6.

The vehicle control device 2 controls behavior of the own vehicle C by controlling components of the own vehicle C such as a brake and a throttle on the basis of target data acquired from the radar device 1. The target data includes a definite value determined by the radar device 1, lateral velocity, and so on.

The vehicle control device 2 is, for example, an adaptive cruise control (ACC) system for performing control such that the own vehicle C follows a preceding vehicle while keeping a predetermined distance from the preceding vehicle, a collision avoidance system for avoiding collision of the own vehicle C with a preceding vehicle or an obstacle, or the like.

Also, the vehicle control device 2 is connected to a yaw rate sensor 3, and outputs the turning velocity of the own vehicle C determined by the yaw rate sensor 3 to the radar device 1. The yaw rate sensor 3 is a sensor for detecting the turning velocity of the own vehicle C. For example, in a case where the running velocity of the own vehicle C is constant, the turning velocity varies depending on the turning radius R of the own vehicle C.

Also, in the present embodiment, the turning radius R is detected on the basis of the turning velocity of the yaw rate sensor 3; however, the present invention is not limited to the yaw rate sensor 3 as long as it is possible to detect the turning radius R of the own vehicle C. For example, instead of the yaw rate sensor 3, a steering sensor for detecting the steering angle of the own vehicle C may be used.

The signal transmitting unit 4 includes a signal generating unit 41, an oscillator 42, and a transmitting antenna TX. The signal generating unit 41 generates a modulation signal in which voltage varies in a triangular wave form, and supplies the modulation signal to the oscillator 42.

The oscillator 42 generates a transmission signal by performing frequency modulation on a continuous-wave signal on the basis of the modulation signal generated by the signal generating unit 41, and outputs the transmission signal to the transmitting antenna TX. The transmitting antenna TX outputs the transmission signal input from the oscillator 42, as a transmission wave TW, to the outside of the own vehicle C.

The signal receiving unit 5 includes, for example, four receiving antennae RX, and individual signal receiving units 51 connected to the four receiving antennae RX, respectively. The receiving antennae RX receive reflected waves RW as reception signals from the target T.

Each individual signal receiving unit 51 includes a mixer 52 and an A/D converter 53, and performs various processes on a reception signal received from a corresponding receiving antenna RX. The mixer 52 mixes the reception signal and the transmission signal input from the oscillator 42, and generates a beat signal representing a difference frequency between both signals. The A/D converter 53 converts the beat signal generated by the mixer 52 into a digital signal, and outputs the digital signal to the signal processing unit 6.

The signal processing unit 6 is a micro computer including a central processing unit (CPU), a storage unit 64, and so on, and controls the whole of the radar device 1. The storage unit 64 stores detection values output from a data processing unit 63, as a detection value history 64a, and stores determined definite values as a definite-value history 64b. As the storage unit 64, for example, an erasable programmable read only memory (EPROM), a flash memory, or the like can be used.

The signal processing unit 6 includes a transmission control unit 61, a Fourier transform unit 62, and a data processing unit 63, as functions which are implemented in a software wise in the micro computer. The transmission control unit 61 controls modulation signal generating timings of the signal generating unit 41 of the signal transmitting unit 4, and so on.

The Fourier transform unit 62 performs fast Fourier transform on the beat signals output from the individual signal receiving units 51, thereby converting the beat signals into frequency spectra which are frequency domains. The Fourier transform unit 62 outputs the generated frequency spectra to the data processing unit 63.

The data processing unit 63 acquires detection values on the basis of the frequency spectra acquired from the Fourier transform unit 62, and determines a definite value on the basis of the detection values, and issues an instruction to the transmission control unit 61.

The data processing unit 63 includes a detecting unit 63a, a selecting unit 63b, a determining unit 63c, a velocity calculating unit 63d, and an output unit 63e. The detecting unit 63a detects the lateral location W of the target T relative to the own vehicle C as a detection value on the basis of reflected waves RW from the target T.

Specifically, on the basis of the frequency spectra acquired from the Fourier transform unit 62, the detecting unit 63a first extracts frequency peaks exceeding predetermined signal power from up sections in which the frequency of the transmission signal increases and down sections in which the frequency decreases.

The detecting unit 63a calculates an angle representing the azimuth of the target T on the basis of each of the extracted frequency peaks. Also, the angle calculation is performed by a predetermined azimuth angle estimating method such as ESPRIT (Estimation of Signal Parameters via Rotational Invariance Techniques).

The detecting unit 63a acquires pair data items by pairing the peak frequencies of the up sections and the down sections using Mahalanobis distances calculated on the basis of the signal powers and angles of the extracted frequency peaks.

On the basis of the angles of the peak frequencies of the up sections and the down sections which are the pair data items, the detecting unit 63a calculates the angle of the target T. Also, on the basis of the peak frequencies of the up sections and the down sections which are the pair data items, the detecting unit 63a calculates the longitudinal location of the target T relative to the own vehicle C. The longitudinal location is the distance from the own vehicle C in the traveling direction.

Further, the detecting unit 63a detects the lateral location W of the target T as a detection value by calculation of a trigonometric function using the calculated angle and the calculated longitudinal location. The detecting unit 63a detects the lateral location W as a detection value at predetermined intervals (for example, at intervals of 50 msec), and outputs the detection values to the selecting unit 63b, and stores the detection values as the detection value history 64a in the storage unit 64.

From the detection value history 64a including the detection values of the lateral location W detected by the detecting unit 63a, the selecting unit 63b selects a predetermined number of detection values depending on the turning radius R of the own vehicle C. Also, the selecting unit 63b acquires a turning velocity depending on the turning radius R from the vehicle control device 2.

Figure 3A:
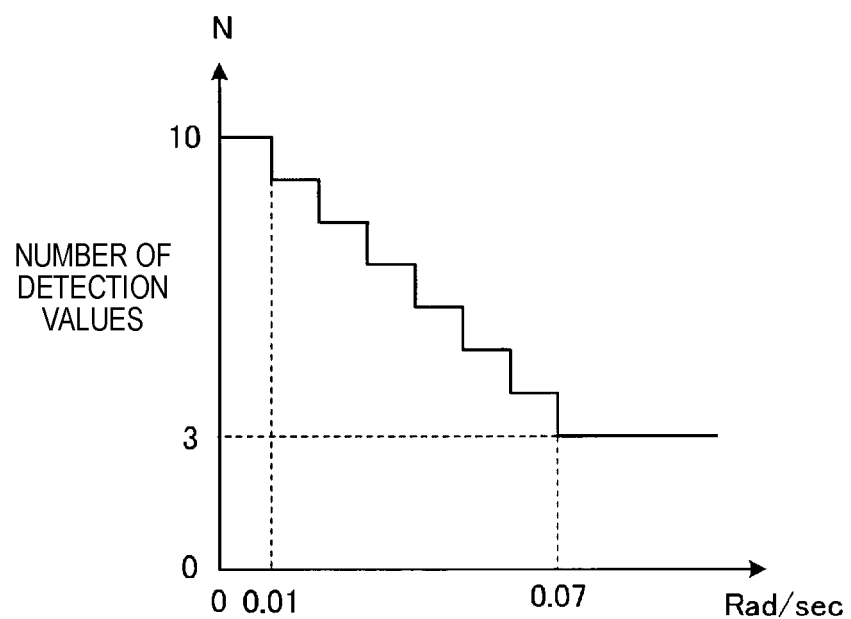
FIG. 3A is a view illustrating a processing content of a selecting unit.
Figure 3B:
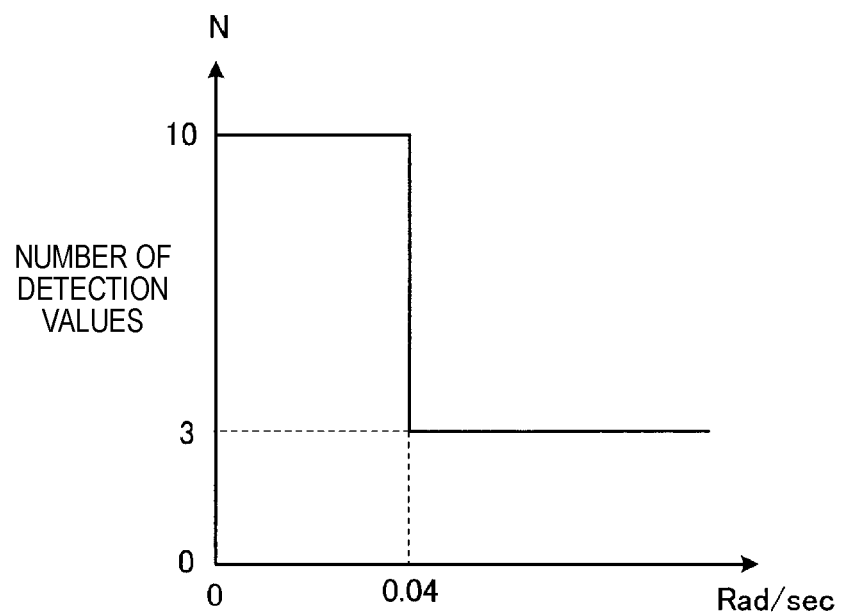
FIG. 3B is a view illustrating the processing content of the selecting unit.
Figure 4:
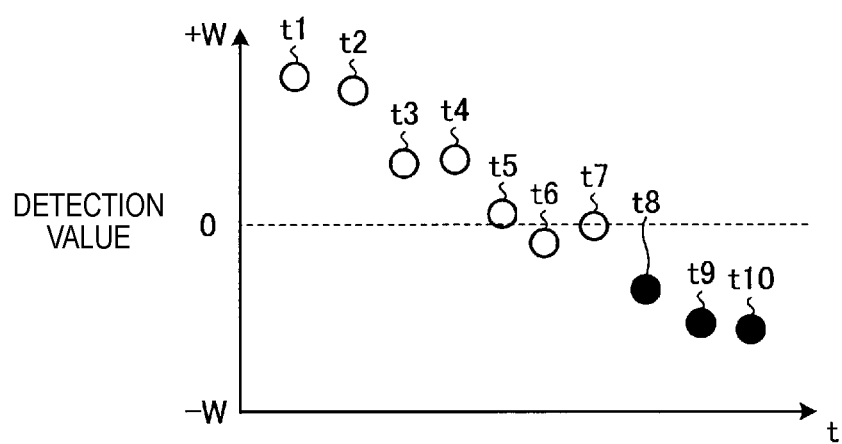
FIG. 4 is a view illustrating the processing content of the selecting unit.

Now, the processing content of the selecting unit 63b will be described in detail with reference to FIGS. 3A to 4. FIGS. 3A to FIG. 4 are views illustrating the processing content of the selecting unit 63b. Graphs shown in FIGS. 3A and 3B show the numbers of detection values to be selected, on the longitudinal axes, and show turning velocities (Rad/sec) on the lateral axes.

FIG. 4 shows a process of selecting a predetermined number of detection values from the detection value history 64a. Also, the contents shown in FIGS. 3A to 4 are examples, and the processing content of the selecting unit 63b is not limited thereto.

First, with reference to FIG. 3A, the processing content of the selecting unit 63b will be described. In a case where it is assumed that the running velocity of the own vehicle C is constant, the turning velocity varies depending on the turning radius R of the own vehicle C. For example, as the turning radius R of the own vehicle C decreases, the turning velocity increases. Further, if the turning velocity increases, the movement amount of the own vehicle C in the lateral direction (the vehicle width direction) increases, and thus a detection value change increases.

As shown in FIG. 3A, as the turning velocity increases, that is, the turning radius R decreases, the selecting unit 63b decreases the number of detection values to be selected. In other words, in a case where the turning velocity increases, since a detection value change increases, if the number of detection values to be selected is decreased, it is possible to improve the accuracy of detection of a definite value to be determined later.

For example, as shown in FIG. 3A, the selecting unit 63b decreases the number of detection values to be selected, in stages, for example, whenever the turning velocity increases by 0.01. As the number of detection values to be selected is adjusted in stages depending on the turning velocity as described above, it is possible to improve the accuracy of definite-value detection regardless of the curve radii of roads.

Also, it is preferable that the selecting unit 63b select at least three detection values regardless of turning velocity, in consideration of varying of detection values. However, the present invention is not limited thereto, and the number of detection values to be selected may be set to two or less.

Also, with reference to FIG. 3A, the case where the turning velocity of the own vehicle C is constant has been described. However, for example, in a case where the running velocity of the own vehicle C varies, the number of detection values to be selected may be determined in consideration of not only varying of detection values but also running velocity.

Also, in FIG. 3A, the selecting unit 63b is configured to decrease the number of detection values to be selected, in stages, whenever the turning velocity increases by 0.01. However, the present invention is not limited thereto. This point will be described with reference to FIG. 3B.

For example, as shown in FIG. 3B, the selecting unit 63b may be configured to switch the number of detection values to be selected, between two values (in FIG. 3B, between 10 and 3), for example, by determining whether the turning velocity is equal to or higher than a predetermined value (in FIG. 3B, 0.04), or not. Also, in FIG. 3B, the number of detection values to be selected is switched between two values; however, it may be switched to three or more values.

Subsequently, the selecting unit 63b selects a predetermined number of detection values from the detection value history 64a, where the predetermined number depends on the turning velocity corresponding to the turning radius R of the own vehicle C. As shown in FIG. 4, the selecting unit 63b selects a predetermined number of detection values depending on the turning radius R, in reverse chronological order, from the detection value history 64a. In this case, since the latest detection values are reflected to a definite value, it is possible to improve the accuracy of definite-value detection.

Also, detection values which the selecting unit 63b selects are not limited to the reverse chronological order, and arbitrary detection values may be selected from the detection value history 64a. This point will be described below with reference to FIGS. 7 and 8.

Now, the consisting of the data processing unit 63 will be described with reference to FIG. 2. The determining unit 63c determines a definite value of the lateral location W on the basis of the detection values selected by the selecting unit 63b. For example, the determining unit 63c determines the average value of the predetermined number of selected detection values, as a definite value.

However, the definite-value determining method is not limited to average values. For example, detection time points of detection values may also be considered. Specifically, for example, the selecting unit 63b may be configured so as to assign a larger weight to a newer detection value. In this case, it is possible to surely reflect the latest detection values to a definite value.

Also, the determining unit 63c outputs the determined definite value to the output unit 63e and the velocity calculating unit 63d, and stores the determined definite value as the definite-value history 64b in the storage unit 64.

The velocity calculating unit 63d calculates the lateral velocity of the target T relative to the own vehicle C by selecting definite values having at least one interval from the definite-value history 64b including the definite values determined by the determining unit 63c in chronological order. The lateral velocity is the relative velocity of the target T to the own vehicle C in the vehicle width direction. Now, the processing content of the velocity calculating unit 63d will be described in detail with reference to FIG. 5.

Figure 5:
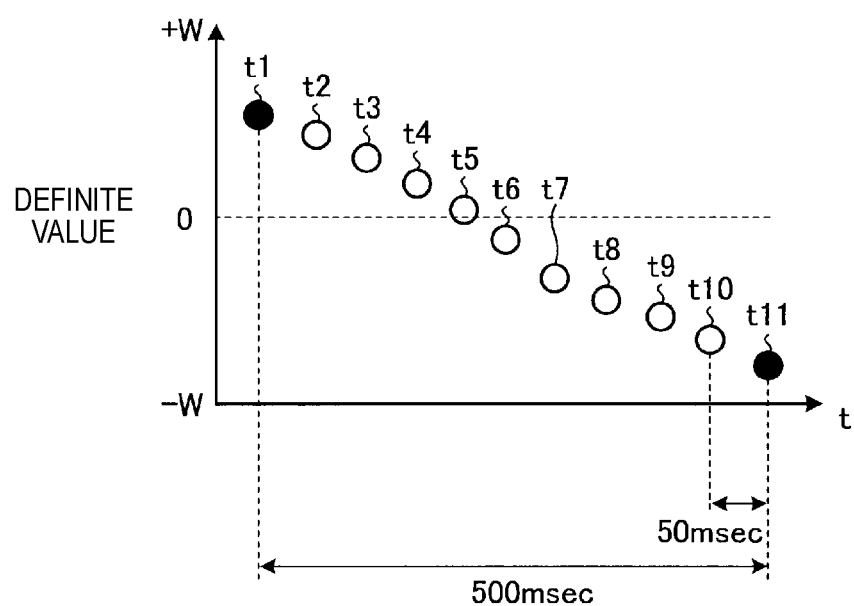
FIG. 5 is a view illustrating a processing content of a velocity calculating unit.

FIG. 5 is a view illustrating the processing content of the velocity calculating unit 63d. A graph shown in FIG. 5 represents the definite-value history 64b, and shows definite values on the longitudinal axis, and shows the determination time points of the corresponding definite values on the lateral axis. Also, the determination time points of the definite values are associated with the detection time points of the detection values. For example, the definite value of a time point t1 shown in FIG. 5 represents that it was determined when the detection value of the time point t1 (see FIG. 4) was detected.

Also, the definite-value history 64b includes a predetermined number of (in FIG. 5, eleven) definite values in chronological order, and the intervals between the definite values (for example, the interval between a time point t10 and a time point t11) is, for example, 50 msec, and are substantially the same as intervals between the detection time points of the detection values.

As shown in FIG. 5, since the variation of the definite values is less, the definite-value history 64b is stabler than the detection value history 64a (see FIG. 4). The lateral velocity calculation of the velocity calculating unit 63d uses those stable definite values. Further, the velocity calculating unit 63d calculates the lateral velocity, for example, using the definite values of the time point t1 and the time point tn.

Now, a lateral-velocity calculating method of the related art will be described. In the calculating method of the related art, for example, in a case of calculating the lateral velocity of the time point t11, the lateral velocity is calculated on the basis of a change between the detection values of two consecutive time points t10 and t11.

Also, if there is a variation between two consecutive detection values, the lateral velocity which is calculated varies significantly. For this reason, in a general calculating method, a filter process of averaging such variations is performed. Therefore, for example, even in a case where the own vehicle C makes a steep turn, the lateral velocity which is calculated shows a gradual change due to the filter process. Therefore, it cannot be said that the general calculating method calculates the lateral velocity with high sensitivity and high accuracy.

For this reason, the velocity calculating unit 63d according to the embodiment uses stable definite values, not detection values having a great variation, and uses definite values having a predetermined number of intervals, not two consecutive values. For this reason, as shown in FIG. 5, the velocity calculating unit 63d calculates the lateral velocity by selecting the definite values of the time point t1 and the time point t11, that is, by omitting the definite values of the time points t2 to t10.

Since the velocity calculating unit 63d uses stable definite values as described above, a filter process of suppressing variation between detection values is unnecessary. Also, since the velocity calculating unit 63d uses definite values having a predetermined number of intervals, even in a case where a change in the lateral velocity is great, it is possible to calculate lateral velocity with high accuracy. In this way, the velocity calculating unit 63d can calculate the lateral velocity with high sensitivity and high accuracy.

Also, the number of definite values which are used to calculate the lateral velocity is not limited to two, and may be three or more as long as the definite values have at least one interval. For this reason, in a case of using three definite values, the detection values may have at least one interval, or two of the three definite values may be consecutive definite values.

The output unit 63e outputs target data including the definite values acquired from the determining unit 63c, the lateral velocity acquired from the velocity calculating unit 63d, and so on, to the vehicle control device 2.

Figure 6:
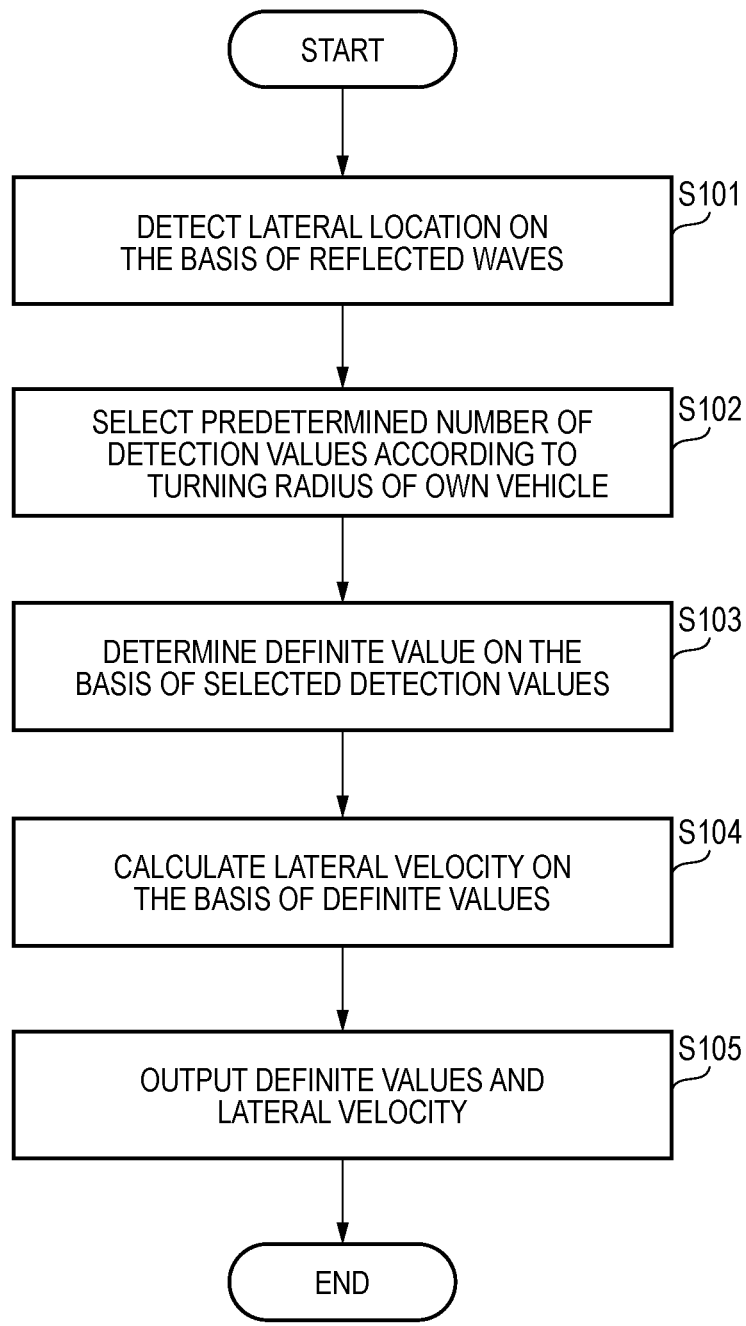
FIG. 6 is a flow chart illustrating the procedure of signal processing to be performed by the radar device according to the embodiment of the present invention.

Now, the processing procedure of signal processing which is performed by the radar device 1 according to the embodiment will be described with reference to FIG. 6. FIG. 6 is a flow chart illustrating the processing procedure of the signal processing which is performed by the radar device 1 according to the embodiment.

As shown in FIG. 6, in STEP S101, the detecting unit 63a detects the lateral location W of the target relative to the own vehicle C, on the basis of reflected waves RW from the target T.

Subsequently, in STEP S102, the selecting unit 63b selects a predetermined number detection values from the detection value history 64a including the detection values detected by the detecting unit 63a in chronological order, where the predetermined number depends on the turning radius R of the own vehicle C.

Subsequently, in STEP S103, the determining unit 63c determines a definite value of the lateral location W on the basis of the detection values selected by the selecting unit 63b.

Subsequently, in STEP S104, the velocity calculating unit 63d calculates the lateral velocity of the target T relative to the own vehicle C by selecting definite values having at least one interval from the definite-value history 64b including the definite values determined by the determining unit 63c in chronological order.

Subsequently, in STEP S105, the output unit 63e outputs target data including the definite values of the lateral location W acquired from the determining unit 63c and the lateral velocity acquired from the velocity calculating unit 63d, to the vehicle control device 2. Then, the processing is finished.

As described above, the radar device 1 according to the embodiment includes the detecting unit 63a, the selecting unit 63b, and the determining unit 63c. The detecting unit 63a detects the lateral location W of the target T relative to the own vehicle C on the basis of the reflected waves RW from the target. The selecting unit 63b selects a predetermined number of detection values from the detection value history 64a including the detection values of the lateral location W detected by the detecting unit 63a in chronological order, where the predetermined number depends on the turning radius R of the own vehicle C. The determining unit 63c determines a definite value of the lateral location W on the basis of the detection values selected by the selecting unit 63b. In this way, the radar device 1 can improve the accuracy of detection on the lateral location W of the target T.

In the above-described embodiment, the selecting unit 63b selects a predetermined number of detection values in reverse chronological order from the detection value history 64a. However, the present invention is not limited thereto. The selecting unit may select detection values of arbitrary time points from the detection value history 64a. Now, a modified example of the detection value selection of the selecting unit 63b will be described with reference to FIGS. 7 and 8. However, scenes shown in FIGS. 7 and 8 are examples, and the present invention is not limited thereto.

FIGS. 7 and 8 are views illustrating a first part and a second part of the processing content of the selecting unit 63b according to the modified example of the embodiment. FIG. 7 shows a case where the turning radius R is constant, and FIG. 8 shows a case where the turning radius R varies. FIG. 7 shows a scene in which the radar device 1 detects a laterally long target T when the vehicle runs around a curve.

Also, it is assumed that the radar device 1 detects detection locations Pt1 to Pt9 at time points t1 to t9, and detects a detection location Pt10 at a time point t10. Detection values of the lateral location W are distances from the detection locations to the center position of the own vehicle C.

As shown in FIG. 7, in a case where the radar device 1 detects the detection location Pt10 at the time point t10, the detection value of the detection value history 64a becomes a value significantly deviated from an appropriate line (not shown in FIG. 7) of the detection values of the time points t1 to t9. If a predetermined number of detection values including the detection value of the time point t10 are selected, a definite value which is determined becomes a value confusable with a different detection location. Therefore, it cannot be said that detection accuracy is high.

For this reason, in a case where the turning radius R is constant, for example, the selecting unit 63b calculates a distance between the above-described appropriate line and the detection value of the time point t10 on a graph, and if the calculated distance is equal to or larger than a predetermined threshold, the selecting unit does not select the detection value of the time point t10, and selects consecutive detection values of the previous time point t9 to the time point t7. Therefore, even in a case where the detection locations of the detection values included in the detection value history 64a are different, it is possible to improve the accuracy of definite-value detection.

Now, the case where the turning radius R varies will be described with reference to FIG. 8. FIG. 8 shows a case where the own vehicle C runs while avoiding an object 100 such as a fallen object on a road. Also, in this case, the radar device 1 detects both of a target T and the object 100; however, in order for a simple explanation, the process of detecting the object 100 will not be described.

As shown in FIG. 8, in the case where the own vehicle C runs while avoiding the object 100, temporarily, the turning radius R varies and the vehicle gets close to the target T. Therefore, in the detection value history 64a, for example, a detection value obtained at a time point t8 when the vehicle was close to the target T is significantly deviated from an appropriate line of detection values of time points t1 to t7. For this reason, in a case of selecting a predetermined number of detection values including the detection value of the time point t8, it cannot be said that the accuracy of definite-value detection is high.

Therefore, the selecting unit 63b detects that the turning radius R has temporarily changed, and omits the detection value of the time point t8 when the turning radius has changed. Like this, if variation in the turning radius R is also considered, it is possible to intentionally prevent a temporal change attributable to the condition of a road from being reflected to a definite value.

Also, in the above-described embodiment, the case where the own vehicle C runs around a curve has been described. However, the present invention is not limited thereto. For example, the present invention can be applied to a case where the own vehicle C turns left or right at an intersection. In this case, the radar device 1 regards the right or left turn of the own vehicle C as a turning operation, and selects a predetermined number of detection values depending on the turning radius R of the corresponding left or right turn.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising:
  a processor configured to function as:
    a detecting unit configured to detect a lateral location of a target relative to a vehicle equipped with the radar device, on the basis of reflected waves from the target;
    a selecting unit configured to select a predetermined number of detection values, the predetermined number depending on a turning radius of the vehicle, from a detection value history including detection values of the lateral location detected by the detecting unit in chronological order; and
    a determining unit configured to determine a definite value of the lateral location on the basis of a calculation of the detection values selected by the selecting unit,
  wherein the selecting unit decreases the predetermined number of the detection values as the turning radius decreases.

2. The radar device according to claim 1, wherein the processor is further configured to act as a velocity calculating unit configured to calculate a lateral velocity of the target relative to the vehicle by selecting definite values having at least one interval from a definite value history including definite values determined by the determining unit in chronological order.

3. The radar device according to claim 1, wherein the selecting unit selects the predetermined number of the detection values from the detection value history in a descending order.

4. A signal processing method comprising:
   a detecting process of detecting a lateral location of a target relative to a vehicle equipped with a radar device, on the basis of reflected waves from the target;
   a selecting process of selecting a predetermined number of detection values, the predetermined number depending on a turning radius of the vehicle, from a detection value history including detection values of the lateral location detected by the detecting process in chronological order; and
   a determining process of determining a definite value of the lateral location on the basis of a calculation of the detection values selected by the selecting process,
   wherein the selecting process decreases the predetermined number of the detection values as the turning radius decreases.

* * * * *